J. BAVIER.
Tobacco Smoke Purifier.
No. 46,989.
Patented March 28, 1865.
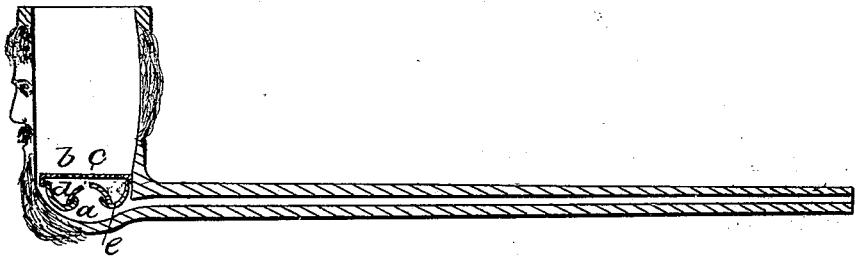
Witnesses
W. M. Gooding
Chas. H. Skinner
Inventor
John Bavier

UNITED STATES PATENT OFFICE.

JOHN BAVIER, OF NEWARK, NEW JERSEY.

TOBACCO-SMOKE PURIFIER.

Specification forming part of Letters Patent No. 46,989, dated March 28, 1865.

*To all whom it may concern:*

Be it known that I, JOHN BAVIER, of the city of Newark, in the county of Essex and State of New Jersey, have invented an Improved Tobacco-Smoke Purifier; and I do hereby declare the following to be a full and exact description of the same, reference being herein had to the drawings that accompany this specification, and which make part of the same.

The nature of my improvement consists in the peculiar construction and form of the purifier, which, while it is not a part of a tobacco-pipe, is adapted for use in any of the pipes now commonly used.

In the drawings, Figure 1 shows a section of a common clay tobacco-pipe and of a purifier placed in the bottom of the bowl. Fig. 2 shows the parts of the purifier.

In the bottom of the bowl $d$ there is an opening with an upward-projecting rim, $a$, upon which the nipple $e$ is tightly fitted, and when desirable it is made fast by soldering; or it may be formed of part of the metal of the bowl. In the top of the nipple is a small hole, $c$. A cover, $b$, fits the top of the bowl $d$, which cover has a number of small perforations around its outer edge; or, if necessary, the whole surface can be filled with holes. When the parts are together, and the purifier is placed in the bowl of the pipe, the smoke is drawn through the cover $b$ into the bowl $d$, thence through the hole $c$ and into the pipe-stem $g$, all the moisture and other impurities being arrested in their passage by the bowl $d$, the most part thereof being volatized by the heat in the bowl, thereby losing all the disagreeable flavor that is the common annoyance of smokers. The deposits can be removed by opening and cleaning the purifier.

What I claim, and desire to secure, is—

A detached smoke-purifier, constructed substantially in the manner and for the purpose hereinabove specified.

JOHN BAVIER.

Witnesses:
 WM. M. GOODING,
 CHAS. H. SKINNER.